US008919858B2

(12) United States Patent
Lee

(10) Patent No.: US 8,919,858 B2
(45) Date of Patent: Dec. 30, 2014

(54) ASSEMBLY OF SWING TYPE TAILGATE CHECKER

(71) Applicant: Hyundai Motor Company, Seoul (KR)

(72) Inventor: Hee Tae Lee, Jeonju-si (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 14/026,416

(22) Filed: Sep. 13, 2013

(65) Prior Publication Data

US 2014/0115970 A1 May 1, 2014

(30) Foreign Application Priority Data

Nov. 1, 2012 (KR) ........................ 10-2012-0122917

(51) Int. Cl.
*B60J 5/00* (2006.01)
*E05C 17/20* (2006.01)

(52) U.S. Cl.
CPC ...................................... *E05C 17/20* (2013.01)
USPC .................................. 296/146.11; 296/146.1

(58) Field of Classification Search
USPC .................... 16/352, 333; 296/146.1, 146.11, 296/146.12; 49/381
See application file for complete search history.

(56) References Cited

U.S. PATENT DOCUMENTS 2,232,986 A * 2/1941 Westrope ...................... 16/86 C
3,051,983 A * 9/1962 Walter Dale ...................... 16/82
5,291,634 A * 3/1994 Zanetti ............................ 16/333
5,862,570 A * 1/1999 Lezuch et al. .................... 16/82
6,438,794 B2 * 8/2002 Ng et al. ........................... 16/82
6,467,126 B1 * 10/2002 Yezersky et al. .............. 16/86 C
6,564,425 B2 * 5/2003 Audisio ........................ 16/86 B
7,971,393 B2 * 7/2011 Gao et al. ......................... 49/386
8,651,556 B2 * 2/2014 Cutting .................... 296/146.12
2003/0111862 A1 * 6/2003 Audisio ..................... 296/146.1
2003/0159244 A1 * 8/2003 Sparkman ..................... 16/86 C
2004/0049882 A1 * 3/2004 Schmoll et al. ................... 16/82
2009/0072582 A1 * 3/2009 Elliott et al. ............. 296/146.11

FOREIGN PATENT DOCUMENTS

JP 2002-106246 A 4/2002
JP 2009-263895 A 11/2009
KR 2003-0000635 A 1/2003
KR 2003-0017726 A 3/2003
KR 10-2004-0029785 A 4/2004
KR 10-2005-0054257 A 6/2005

* cited by examiner

*Primary Examiner* — Jerry Redman
(74) *Attorney, Agent, or Firm* — Morgan, Lewis & Bockius LLP

(57) ABSTRACT

An assembly of a swing type tailgate checker includes: a checker assembly including a first base bracket on a vehicle body and having a hole at one side and an arm locking member at an outer side of the first base bracket to form a fitting space together with the first base bracket and partially bent toward the first base bracket; and an arm assembly including a second base bracket on a tailgate of a vehicle and including an arm extended from the second base bracket toward the vehicle body and having an arm roller provided at an end portion, wherein at the time of opening the tailgate, the arm roller is temporarily fixed while being locked by the arm locking member at a primary open angle and passes through the arm locking member to thereby be unlocked, such that it is completely opened while being again rotated.

7 Claims, 9 Drawing Sheets

ASSEMBLY OF SWING TYPE TAILGATE CHECKER

CROSS-REFERENCE TO RELATED APPLICATION

The present application claims priority of Korean Patent Application Number 10-2012-0122917 filed Nov. 1, 2012, the entire contents of which application is incorporated herein for all purposes by this reference.

BACKGROUND OF INVENTION

1. Field of Invention

The present invention relates to an assembly of a swing type tailgate checker, and more particularly, to an assembly of a swing type tailgate checker capable of solving inconvenience of a user according to the related art by further applying force capable of releasing locking in a direction in which a swing type tailgate is opened at the time of opening the swing type tailgate to easily open the tailgate.

2. Description of Related Art

A leisure vehicle or a European van is provided with a tailgate completely opening a rear of the vehicle. The tailgate is divided into a single swing type tailgate hinge-jointed to a rear upper end of a roof to lift a lower part and a twin swing type tailgate vertically dividing the single swing type tailgate and hinge-joint the divided single swing type tailgates to rear fillers to open them in an opening and closing scheme.

The twin swing type tailgate is configured so that an opening and closing operation thereof is performed via a checker assembly installed at a side of a vehicle body 1 and a door hinge installed under the checker assembly in a vertical direction and is configured to be selectively opened at angles of 90 degrees and 90 degrees or more.

FIGS. 1 to 5 show an assembly of a twin swing type tailgate according to the related art. The assembly of a twin swing type tailgate is configured to include a checker assembly 100 mounted on a vehicle body 1 and an arm assembly 200 mounted on a tailgate 2. A hinge on the vehicle body 1 is connected to a lower portion of the tailgate 2.

The checker assembly 100 includes a first base bracket 101 fixed to the vehicle body 1; a first arm guide 102 protruding from a front end portion of the first base bracket 101; and a second arm guide 103 and a first arm locking 104 that are rotatably connected to each other by a rivet 105 at a rear end portion of the first base bracket 101 (see FIG. 2). The first arm locking 104 is bent so that a locking jaw is formed at an end portion of one side thereof. The other end of the second arm guide 103 connected to the first base bracket 101 is bent in an opposite direction to a direction in which the first arm locking 104 is bent.

The arm assembly 200 includes a second base bracket 201 fixed to an inner side of the tailgate 2; an arm 202 extended from one side of the second base bracket 201 to the vehicle body; a roller 209 provided at an end portion of the arm 202; and a second arm locking 207 provided at the second base bracket 201 (see FIG. 3). The arm 202 is connected to the second base bracket 201 via a pin, wherein the pin includes a spring wound at an outer side thereof and installed so that rotational force is maintained in a direction toward an outer side of the vehicle.

As shown in FIG. 1, when the tailgate 2 is in a closed state, the arm 202 of the arm assembly 200 is connected to the checker assembly 100 provided on the vehicle body 1 so as to be guide along the first arm guide 102. The arm 202 is provided with a groove into which a bent part of the first arm locking 104 is fitted.

At the time of opening the twin swing type tailgate according to the related art configured as described above, the second base bracket 201 provided on the tailgate 2 is rotated together with the tailgate 2 by rotation of the tailgate 2, and the arm 202 connected to the second base bracket 201 also moves while being guided along the first arm guide 102 and being rotated toward the rear, that is, the tailgate 2.

As shown in FIG. 4, when the tailgate 2 is opened at an angle of 90 degrees, the roller 209 provided at the end portion of the arm 202 is locked by a bent part of the first arm locking 104. At the time of opening the tailgate 2 at an angle larger than 90 degrees, the tailgate 2 is slightly closed in a direction in which it is closed, such that the roller 209 is unlocked while being separated from the first aim locking 104. Then, as shown in FIG. 5, the arm 202 is rotated toward the tailgate using a hand to thereby be fixed to the second arm locking 207 provided at the second base bracket 201, and the tailgate 2 is opened at the angle larger than 90 degrees.

In order to open the twin swing type tailgate according to the related art as described above at an angle of 90 degrees or more, a door opened at an angle of 90 degrees should be slightly closed in the direction in which it is closed to unlock between the roller and the first aim locking, and the arm should be then rotated using the hand to uncouple between the checker assembly and the arm assembly, which is inconvenient.

The information disclosed in this Background section is only for enhancement of understanding of the general background of the invention and should not be taken as an acknowledgement or any form of suggestion that this information forms the prior art already known to a person skilled in the art.

BRIEF SUMMARY

Accordingly, various aspects of the present invention have been made to solve the above-mentioned problems occurring in the prior art while advantages achieved by the prior art are maintained intact.

Various aspects of the present invention provide for an assembly of a swing type tailgate checker capable of easily opening a tailgate by further applying force capable of releasing locking in a direction in which the tailgate is opened at the time of opening the tailgate at a predetermined angle or more.

Various aspects of the present invention provide for an assembly of a swing type tailgate checker including: a checker assembly including a first base bracket mounted on a vehicle body and having a hole provided at one side thereof and an arm locking member mounted at an outer side of the first base bracket so as to form a fitting space together with the first base bracket and partially bent toward the first base bracket; and an arm assembly including a second base bracket mounted on a tailgate of a vehicle and including an arm extended from the second base bracket toward the vehicle body and having an aim roller provided at an end portion thereof, wherein at the time of opening the tailgate, the arm roller is temporarily fixed while being locked by the arm locking member at a primary open angle and passes through the arm locking member to thereby be unlocked, such that it is completely opened while being again rotated.

Therefore, in the state in which the tailgate is opened at the primary open angle, force enough to allow the arm roller to pass through the arm locking member is applied to the tailgate to release the locking, thereby making it possible to open the tailgate at an angle of a predetermined angle or more. Therefore, inconvenience according to the related art that the tailgate is again closed at a predetermined angle and the locking is released by a hand may be decreased.

The methods and apparatuses of the present invention have other features and advantages which will be apparent from or are set forth in more detail in the accompanying drawings, which are incorporated herein, and the following Detailed Description, which together serve to explain certain principles of the present invention.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention (s) is/are intended to cover not only the exemplary embodiments, but also various alternatives, modifications, equivalents and other embodiments, which may be included within the spirit and scope of the invention as defined by the appended claims.

Figure 6:
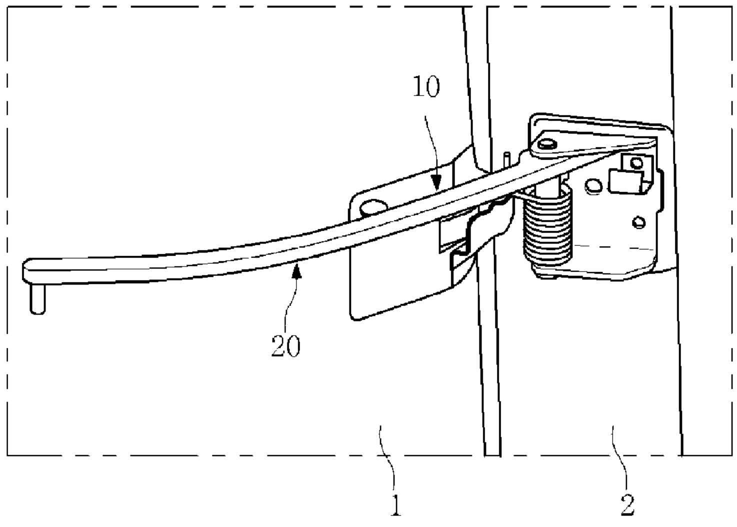
FIG. 6 is a view showing a state in which an assembly of an exemplary swing type tailgate checker according to the present invention is closed.

As shown in FIG. 6, an assembly of a swing type tailgate checker according to various embodiments of the present invention is configured to include a checker assembly 10 mounted on a vehicle body 1 and an arm assembly 20 mounted on an inner side of a tailgate 2.

Figure 7:
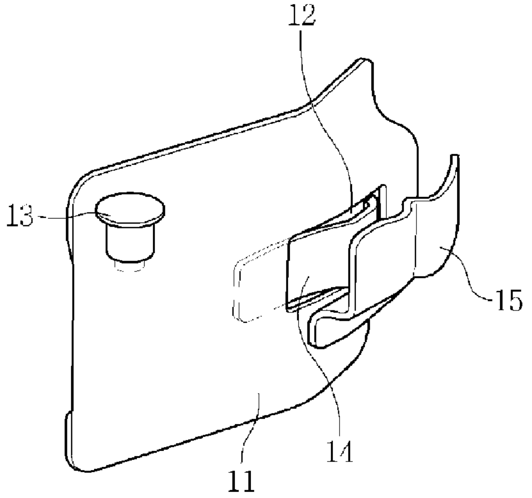
FIG. 7 is a view showing a checker assembly of the assembly of an exemplary swing type tailgate checker according to the present invention.

As shown in FIG. 7, the checker assembly 10 is provided with a first base bracket 11 fixed to the vehicle body 1 to support the entire checker assembly 10 and an arm locking member. The arm locking member includes a first arm locking 14 and an arm locking guide 15.

One side of the first base bracket 11 is provided with a hole 12, and an upper end portion of the other side thereof is provided with an arm guide 13. An inner side of the hole 12 of the first base bracket 11 is provided with the first aim locking 14, and an outer side of the hole 12 thereof is provided with the arm locking guide 15.

The aim guide 13 is protruding from an upper end of the first base bracket 11 and serves to guide movement of an arm 22 to be described below. Although the arm guide 13 protrudes only at the upper end of the first base bracket 11, the arm guides 13 may also be provided at both of upper and lower ends of the first base bracket 11 to guide an arm 22 to be described below at upper and lower portions.

The first arm locking 14 is provided on an inner side of the first base bracket 11. A portion of the first arm locking 14 is bent to form a protrusion part 14', which is protruded outwardly the hole 12.

The arm locking guide 15 is provided at an outer side of the first base bracket 11 so as to face the first arm locking 14 as described above. The arm locking guide 15 is mounted under the hole 12 and at the outer side of the first base bracket 11, such that a predetermined space is formed between the arm locking guide 15 and the first arm locking 14. A portion of the arm locking guide 15 is bent, such that a concave part 15' bent in a direction toward the first arm locking 14 and a convex part 15" bent in an opposite direction to the above-mentioned direction are formed.

Figure 8:
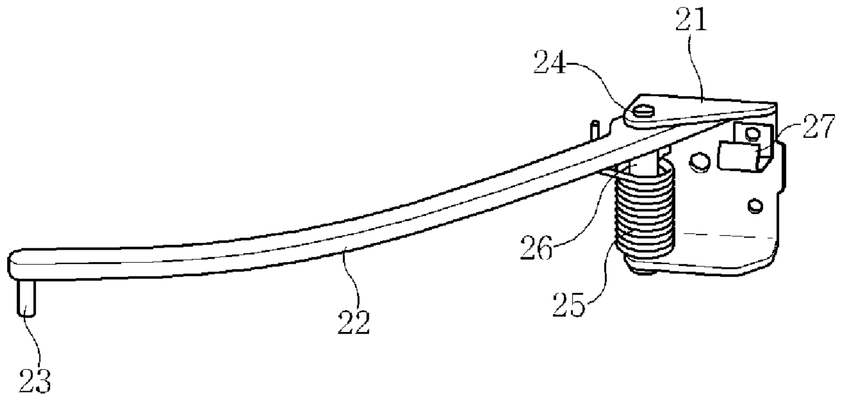
FIG. 8 is a view showing an arm assembly of the assembly of an exemplary swing type tailgate checker according to the present invention.

As shown in FIG. 8, the arm assembly 20 is provided with a second base bracket 21 mounted on the inner side of the tailgate 2 to support the entire arm assembly 20. The arm 22 extended from the second base bracket 21 is connected to one side of the second base bracket 21 through a pin 24. An outer portion of the pin 24 is mounted with a damper 26, wherein the damper 26 has a spring 25 wound at an outer portion thereof. The spring 25 is provided in order to maintain rotational force in a direction toward an outer side of the vehicle, and the damper 26 adjusts a rotation speed. The other side of the second base bracket 21 of which one side is connected to the arm 22 is provided with a second arm locking 27.

The arm 22 is extended from one side of the second base bracket 21 toward the checker assembly 10 and includes an arm roller 23 provided at an end portion thereof. The arm roller 23 is made of a soft material and is extended downwardly from the arm 22.

The second arm locking 27 is provided at the second base bracket 21 and is partially bent to allow the arm 22 to be fitted therein and fixed thereto.

The use of the assembly of a swig type tailgate checker configured as described above will be described with reference to FIGS. 9 to 12.

Figure 1:
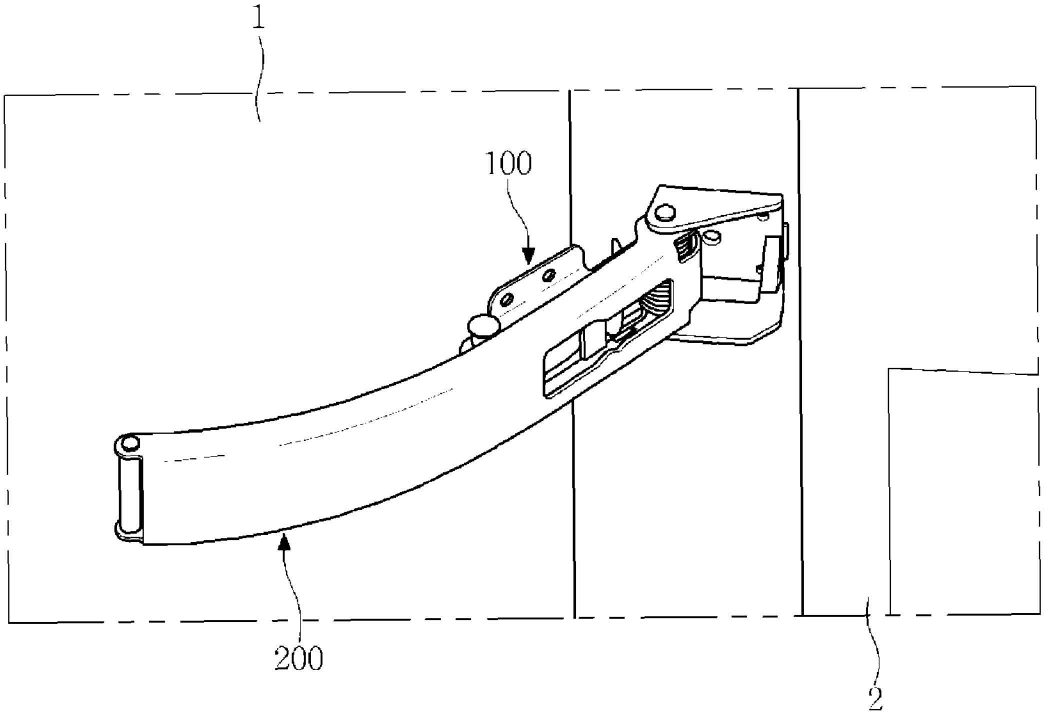
FIG. 1 (Related Art)
FIG. 1 is a view showing a state in which a twin swing type tailgate according to the related art is closed.
Figure 2:
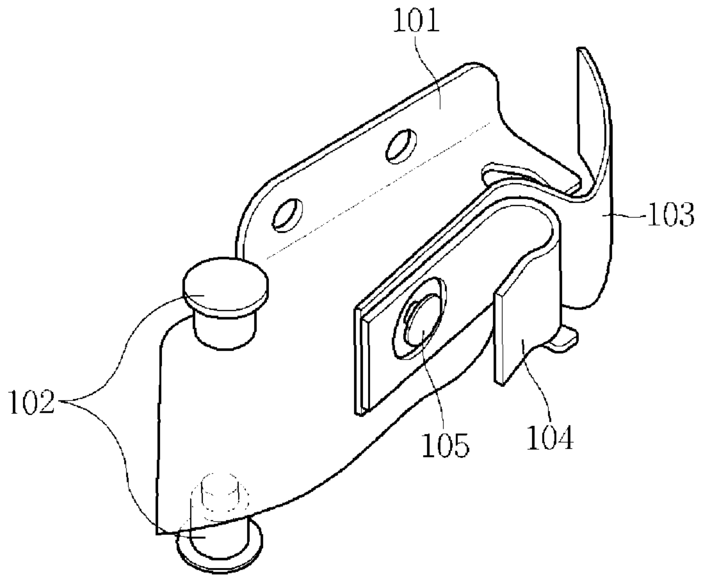
FIG. 2 (Related Art)
FIG. 2 is a view showing a checker assembly of the twin swing type tailgate according to the related art.
Figure 3:
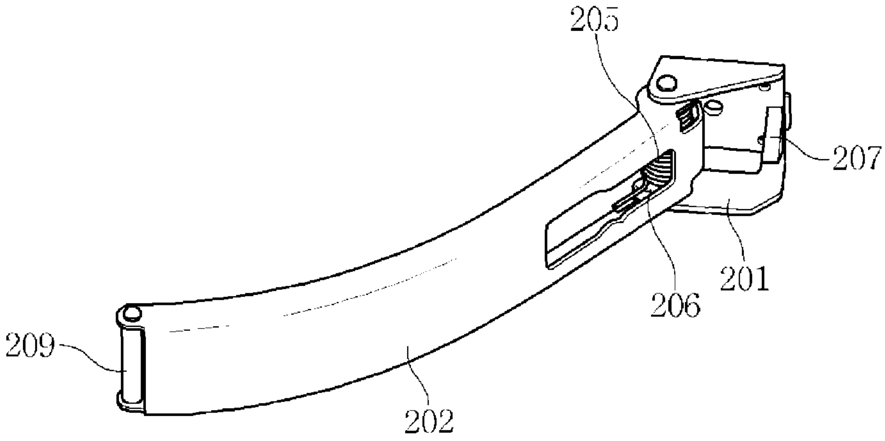
FIG. 3 (Related Art)
FIG. 3 is a view showing an arm assembly of the twin swing type tailgate according to the related art.
Figure 4:
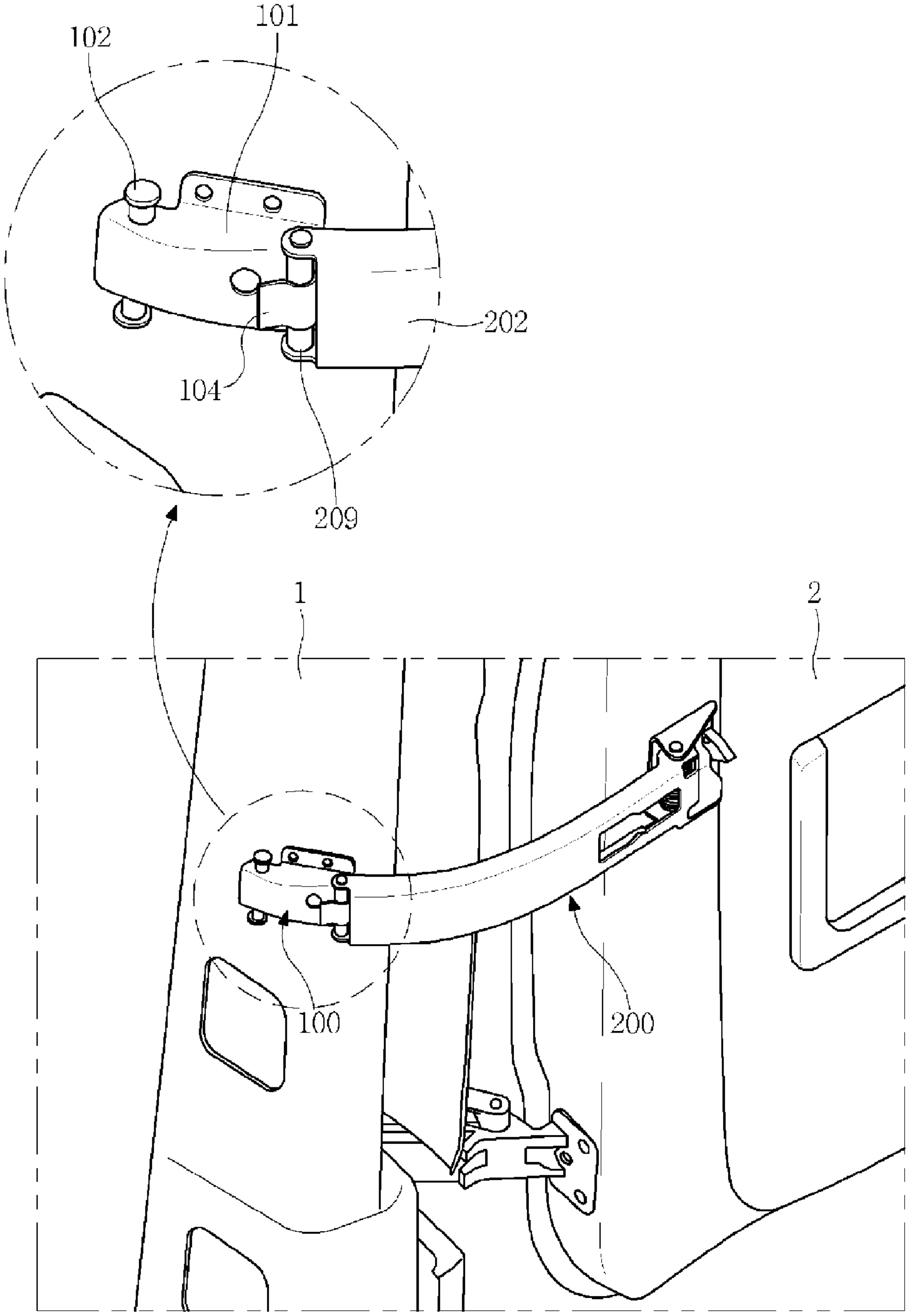
FIG. 4 (Related Art)
FIG. 4 is a view showing a state in which the twin swing type tailgate according to the related art is opened at an angle of 90 degrees.
Figure 5:
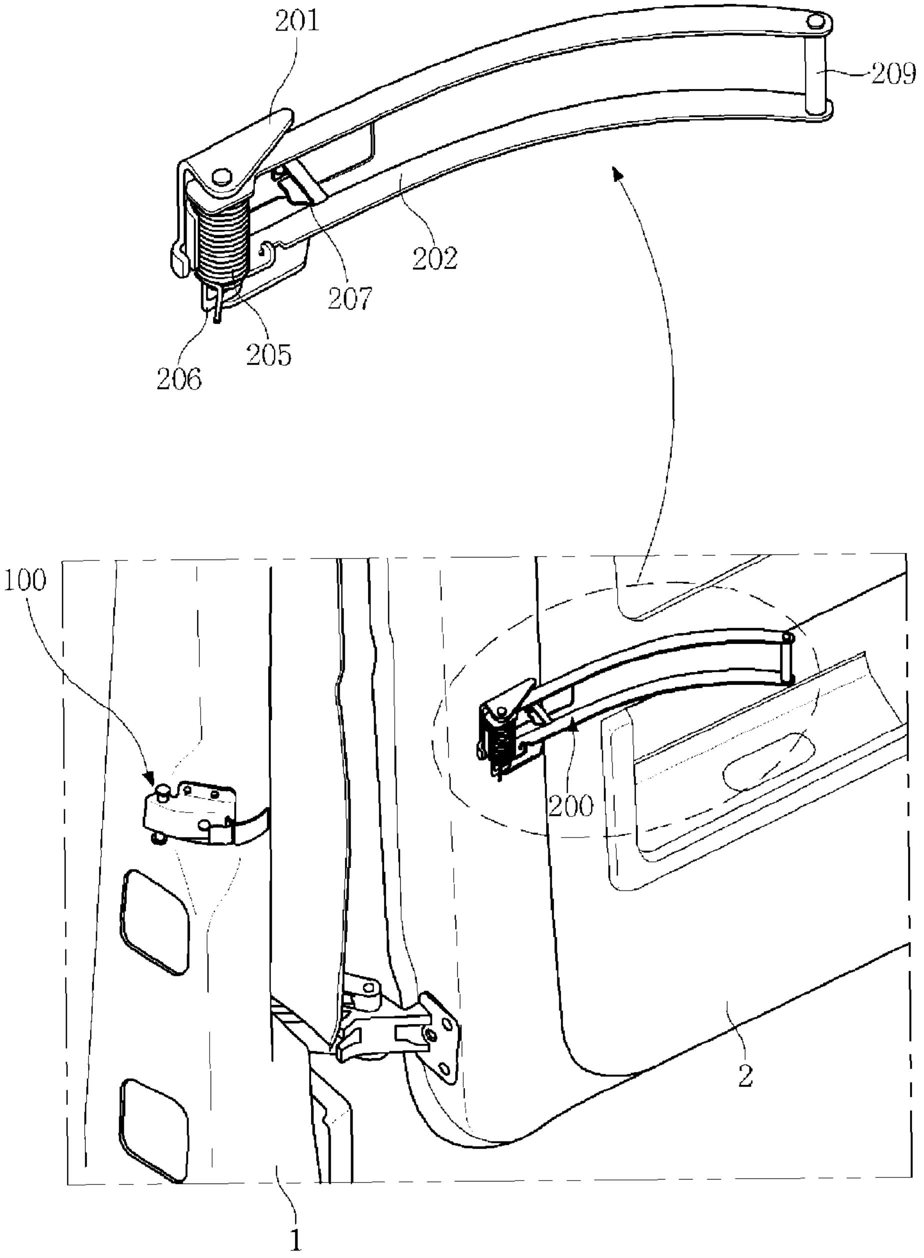
FIG. 5 (Related Art)
FIG. 5 is a view showing a state in which the twin swing type tailgate according to the related art is opened at an angle of 90 degrees or more.
Figure 9:
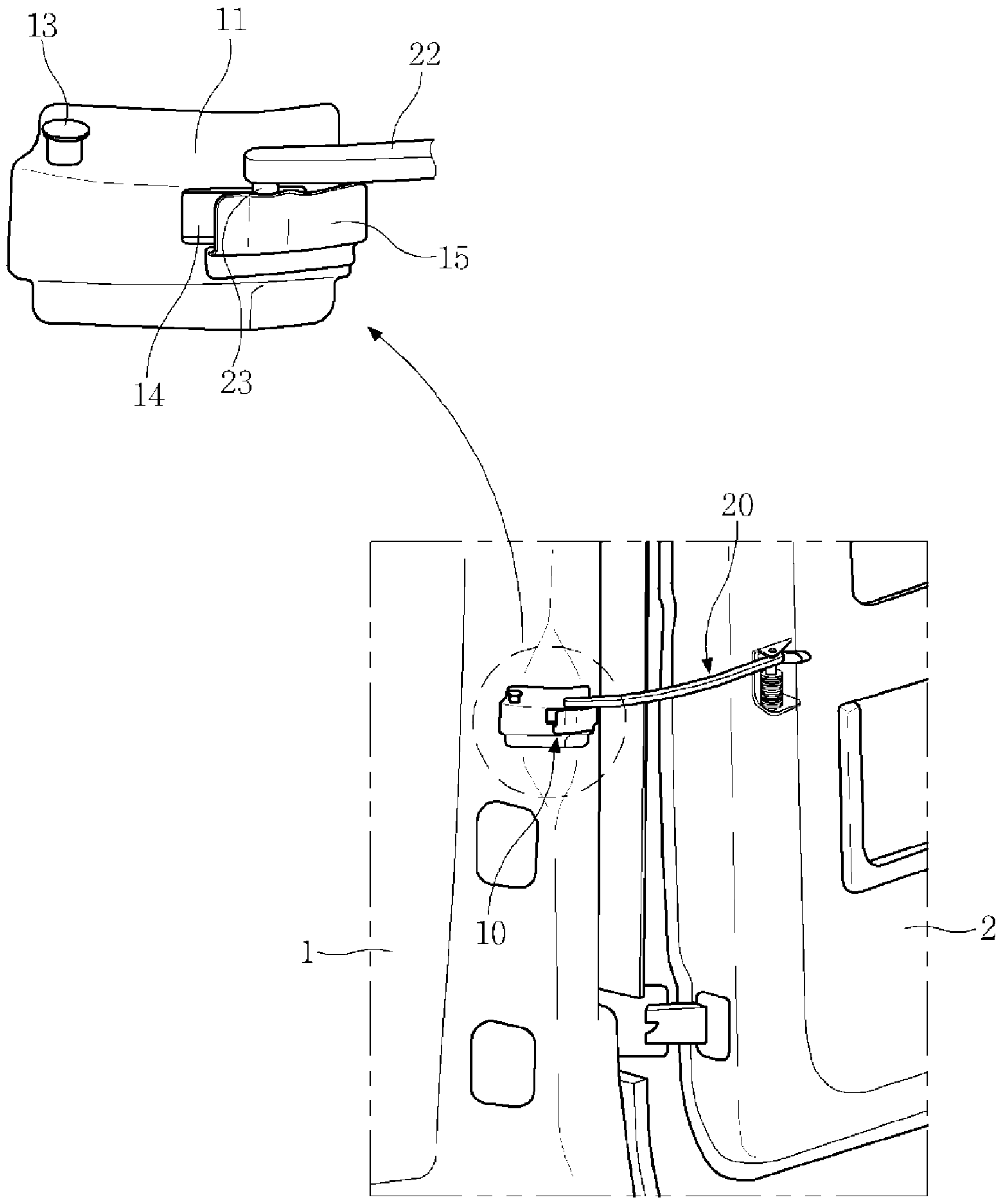
FIG. 9 is a view showing a state in which the assembly of an exemplary swing type tailgate checker according to the present invention is opened at a primary open angle.
Figure 10:
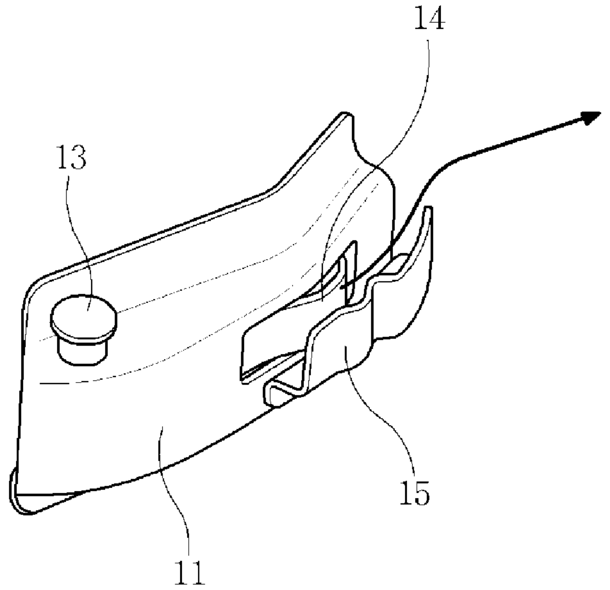
FIG. 10 is a view showing a trajectory along which an arm roller escapes at the time of opening the assembly of an exemplary swing type tailgate checker according to the present invention at an angle of the primary open angle or more.
Figure 11:
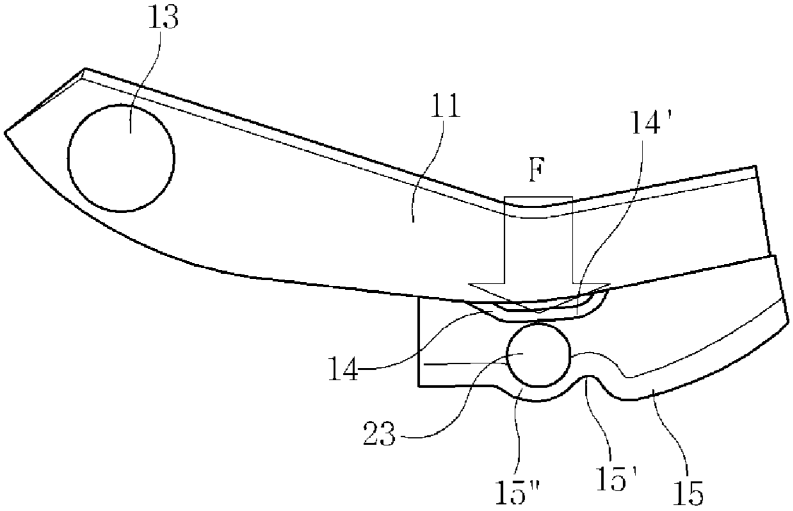
FIG. 11 is a view showing a state in which the arm roller of the assembly of an exemplary swing type tailgate checker according to the present invention is fitted.

The tailgate 2 starts to be opened from a state in which it is completely closed (see FIG. 1) and is rotated based on a hinge. Therefore, the second base bracket 21 provided on the tailgate 2 is also rotated together with the tailgate 2, and the arm 22 connected to the second base bracket 21 also moves rearward while being guided by the arm guide 13. An upper end of the arm 22 is guided while contacting a lower portion of the arm guide 13. In this state, the tailgate 2 is opened at a primary open angle of 80 to 100 degrees. FIG. 9 is a view showing a state in which the tailgate 2 is opened at an angle of 80 to 100 degrees. As shown in FIG. 9, when the tailgate 2 is opened at the angle of 80 to 100 degrees, the arm roller 23 provided at the end portion of the arm 22 is in a state in which it is locked between the first arm locking 14 and the arm locking guide 15. The arm roller 23 is positioned between the convex part 15" of the arm locking guide 15 and the protrusion part 14' of the first arm locking (see FIG. 11) and no longer moves by the concave part 15' of the arm locking guide 15 to thereby be maintained in a state in which it is locked. When force is further applied to the tailgate 2 in order to open the tailgate 2 at an angle of 80 to 100 degrees or more, since the arm roller 23 is made of the soft material, it escapes from the concave part 15'. The locking is released. FIG. 10 is a view showing a trajectory of the arm roller 23 as described above.

Figure 12:
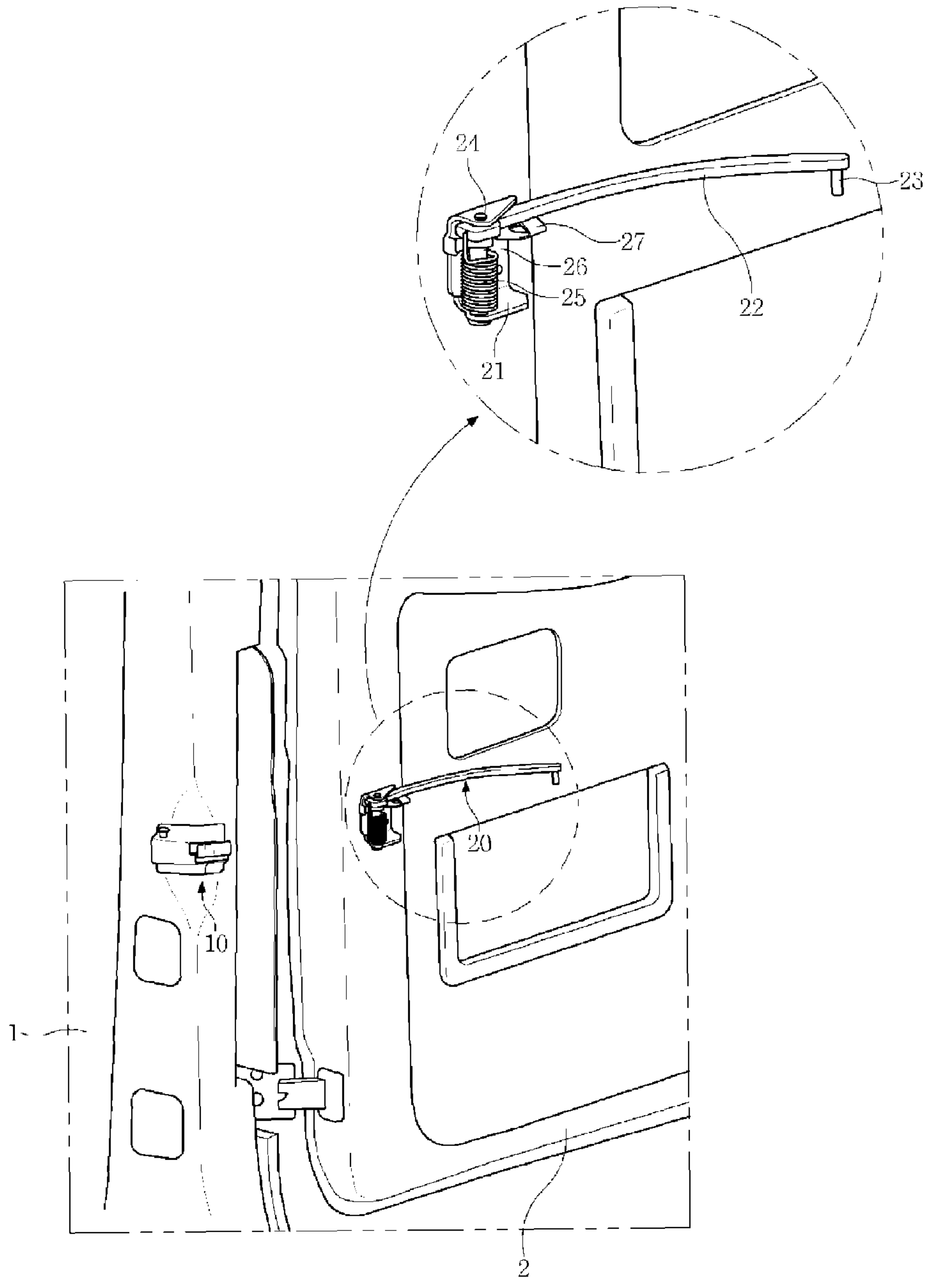
FIG. 12 is a view showing a state in which the assembly of an exemplary swing type tailgate checker according to the present invention is opened at an angle of the primary open angle or more.

FIG. 12 is a view showing a form in which the tailgate 2 is completely opened. As shown in FIG. 12, as the tailgate 2 is opened at an angle of 180 degrees, the arm 22 completely escapes and is separated from the checker assembly 10. The arm 22 escaping from the checker assembly 10 is rotated so as not to be encumbered, such that it is fixed to the second arm locking 27 provided at one side of the second base bracket 21. Therefore, the arm 22 is positioned at the tailgate 2 side.

As set forth above, force capable of releasing locking is further applied in a direction in which the tailgate is opened at the time of opening the tailgate at an angle of a predetermined angle or more, such that the tailgate may be easily opened, thereby making it possible to solve inconvenience of a user according to the related art.

For convenience in explanation and accurate definition in the appended claims, the terms upper or lower, front or rear, and etc. are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A swing tailgate checker assembly apparatus for a vehicle comprising:

a checker assembly including:

a first base bracket mounted on a vehicle body and having a hole provided at a first side thereof; and an arm locking member mounted at an outer side of the first base bracket to form a fitting space together with the first base bracket and partially bent toward the first base bracket; and an arm assembly including:

a second base bracket mounted on a tailgate of the vehicle; and an arm extending from the second base bracket toward the vehicle body and having an arm roller provided at an end portion thereof;

wherein at a time of opening the tailgate, the arm roller is temporarily fixed while being locked by the arm locking member at a primary open angle and then passes through the arm locking member to be unlocked from the arm locking member so that the tailgate is completely opened while the arm rotates, and wherein the arm locking member includes:

a first arm locking mounted between the first base bracket and the vehicle body and including a bent part provided at a first side thereof and protruded outwardly of the hole of the first base bracket; and an arm locking guide mounted at an outer side of the first base bracket and having a concave part and a convex part.

2. The swing tailgate checker assembly apparatus according to claim 1, wherein the primary open angle of the tailgate is 80 to 100 degrees.

3. The swing tailgate checker assembly apparatus according to claim 1, wherein the arm is fitted into the fitting space at a time of closing the tailgate and the arm roller is locked by a bent part of the arm locking member at a time of opening the tailgate, such that the tailgate is temporarily fixed at the primary open angle, and a force is further applied to the tailgate in a state in which the tailgate is opened at the primary open angle to allow the arm roller to escape from the bent part of the arm locking member to thereby be unlocked and escape from the fitting space, so that the tailgate is completely opened.

4. The swing tailgate checker assembly apparatus according to claim 1, wherein the arm assembly further includes:

a pin connecting the arm and the second base bracket to each other;

a damper provided at an outer side of the pin; and a spring wound at an outer side of the damper.

5. The swing tailgate checker assembly apparatus according to claim 1, wherein the checker assembly further includes an arm guide protruding at a first side of the hole provided in the first base bracket to guide movement of the arm.

6. The swing tailgate checker assembly apparatus according to claim 1, wherein the arm assembly further includes a second arm locking mounted at a first side of the second base bracket and bent to fix the arm at a time of opening the tailgate at a predetermined angle.

7. The swing tailgate checker assembly apparatus according to claim 1, wherein the arm roller is made of an elastic material to thereby be deformed when escaping between a protrusion part of the first arm locking and the convex part of the arm locking guide, so that fitting between the arm roller and the arm locking member is easily released.

* * * * *